United States Patent
Broll et al.

(10) Patent No.: US 8,224,845 B2
(45) Date of Patent: Jul. 17, 2012

(54) TRANSACTION PREDICTION MODELING METHOD

(75) Inventors: Bjoern Broll, Hamburg (DE); Torsten Steinbach, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 722 days.

(21) Appl. No.: 12/353,926

(22) Filed: Jan. 14, 2009

(65) Prior Publication Data

US 2009/0187534 A1    Jul. 23, 2009

(30) Foreign Application Priority Data

Jan. 21, 2008    (EP) .................................... 08150446

(51) Int. Cl.
G06F 17/30 (2006.01)
G06F 7/00 (2006.01)
G06F 3/048 (2006.01)

(52) U.S. Cl. ........ 707/771; 707/718; 707/759; 707/779; 715/771

(58) Field of Classification Search ........... 707/999.003, 707/999.102, 999.103, 718, 759, 760, 765, 707/771, 779; 705/5, 10, 35; 715/771
See application file for complete search history.

(56) References Cited

U.S. PATENT DOCUMENTS

| | | | | |
|---|---|---|---|---|
| 7,711,687 B2* | 5/2010 | Rappaport et al. | ............ | 345/420 |
| 7,873,643 B2* | 1/2011 | Hadzikadic et al. | .......... | 707/751 |
| 7,958,113 B2* | 6/2011 | Fan et al. | ....................... | 707/718 |
| 2002/0099594 A1* | 7/2002 | Heard | .............. | 705/10 |
| 2004/0117395 A1* | 6/2004 | Gong et al. | .................. | 707/101 |
| 2008/0189639 A1* | 8/2008 | Iyer et al. | ...................... | 715/771 |
| 2008/0288326 A1* | 11/2008 | Abramowicz | .................. | 705/10 |
| 2009/0165110 A1* | 6/2009 | Becker et al. | ..................... | 726/9 |

* cited by examiner

Primary Examiner — Mohammad Ali
Assistant Examiner — Bao Tran
(74) Attorney, Agent, or Firm — Kali Law Group, P.C.

(57) ABSTRACT

Methods of generating a transactions prediction model using a computer for optimizing a number of transactions associated with a database system include capturing a database workload, where the database workload includes a number of statements corresponding with the transactions over a specified period of time, where each of the statements includes a variable parameter; then generating a generalized statements from the statements by replacing the variable parameter with a constant value; then generating other generalized statements, where if two or more of the number of the generalized statements are the same grouping the generalized statements to correspond with the other generalized statements; and then creating transaction classes, where each of the transaction classes includes at least one generalized statements.

17 Claims, 4 Drawing Sheets

Fig. 1

(a) Database Workload

| User | Application | Time Slot | Transaction id | Statement |
|---|---|---|---|---|
| Alice | Finance | 08:00 | 1 | Select* from Customers where name = 'Alice' and surname = 'P' |
| Bob | Logistics | 08:01 | 2 | Insert into Client values ('IBM') |
| Alice | Finance | 08:01 | 1 | Insert into Customers values ('Alice', 'Parker') |
| Alice | Finance | 08:02 | 3 | Select from Customers where name = 'Richard' and surname = 'M' |
| Alice | Finance | 08:03 | 3 | Select from Account where knr = '12' |

(b) Generalize Statements

| Statement | Generalization (Anonymization) |
|---|---|
| Select* from Customers where name = 'Alice' and surname = 'P' | Select* from Customers where name = ? and surname = ? |
| Insert into Customers values ('Alice', 'Parker') | Insert into Customers values (?, ?) |
| Select from Customers where name = 'Richard' and surname = 'M' | Select from Customers where name = ? and surname = ? |
| Select from Account where knr = '12' | Select from Account where knr = ? |

(c) Generate New Generalized Statements

| Statement | Generalized Statements |
|---|---|
| Select* from Customers where name = 'Alice' and surname = 'P' | Select from Customers where name = ? and surname = ? |
| Select from Customers where name = 'Richard' and surname = 'M' | |
| Insert into Customers values ('Alice', 'Parker') | Insert into Customers values (?, ?) |
| Select from Account where knr = '12' | Select from Account where knr = ? |

(d) Creation of Transaction Classes

| Sequence of Generalized Statements | Transaction Classes |
|---|---|
| For User Alice and Application Finance | |
| 1. Select from Customers where name = ? and surname = ? 2. Insert into Customers values (?, ?) | A |
| 1. Select* from Customers where name = ? and surname = ? 2. Select* from Account where knr = ? | B |

TRANSACTION PREDICTION MODELING METHOD

PRIORITY CLAIM TO FOREIGN APPLICATION

A claim for priority is hereby made under the provisions of 35 U.S.C. §119 for the present application based upon European Patent Application No. 08150446.6, filed on Jan. 21, 2008, which is incorporated herein by reference.

FIELD OF THE INVENTION

The invention relates to a method of generating a transactions prediction model in a database management system, to a computer program product and to a database management system.

BACKGROUND

A database system is a system designed to manage a database and run operations and commands on the data requested by numerous users. The database management system is a set of programs that manages the organization, storage and retrieval of data in a database. The programs may include: a modeling language to define the schema of each database located in the database management system; data structures as fields, records, files and objects optimized to deal with a very large amount of data stored on a device; and a database query language to allow users to interact with the database and analyze its data and update it.

Most database workloads issued by online transaction processing (OLTP) applications that use a database system follow deterministic rules. The transactions are issued to the database system by the applications, wherein the transactions are constructed by the application logic and the variable parameters received by the input masks of the application.

The optimization of database systems is an important task for reducing the response time of database queries and increasing the transaction throughput. Therefore, a method of generating a transactions prediction model in a database system, a computer program product and a database system is needed.

BRIEF SUMMARY

The present invention provides a method of generating a transactions prediction model in a database system, a transaction being a sequence of statements of an application, a statement being a command in a database language, the statement comprising a statement text and variable parameters, the method comprising the steps of: capturing a database workload, the database workload including statements, a user name for each statement, a transaction id for each statement, an application name for each statement and a time slot for each statement; generalizing the list of statements from the database workload by replacing the variable parameters with a constant value; and generating a new generalized statement for each statement with a different statement text.

The method further comprises: creating transaction classes by grouping all transactions, with a same sequence of generalized statements and using the transaction id; identifying possible sequences between transaction classes by calculating probabilities of transitions between the transaction classes using transitions of transactions from a plurality of captured database workload; comparing at least a first issued generalized statement with at least a first statement of the transaction classes for identifying a current transaction class, and; predicting a next transaction and/or sequence of generalized statement using the highest transition probability from a current transaction class.

The statement text is the part of the statement that does not includes variable parameters. The variable parameters are potential content values of the database tables. One of the advantages of the embodiments of the invention is that it allows improving the performance of database systems by: increasing the transactions throughput, lowering the response time for the statements and advanced workload management. For each user and application, a different prediction model can be constructed. The prediction model represents the possible transaction classes and the transitions between the transaction classes that can be issued by an application. In general, the more workload has been captured, the better the representation is.

In an embodiment of the invention, the method further comprises: classifying the database workload in users, and/or user groups, and/or applications, and/or application groups, and/or time slots.

In another embodiment of the invention, the method further comprises: generating a prediction model for each application and/or each user and/or a predetermined time slots. One of the advantages is that a different prediction model is generated for each user running on a specific application, and it may be further specified to a time slot, as e.g. a day of the week, a time in the day, or a day in the month. This allows a great precision in the prediction of the behaviour of the users of the applications.

In a further embodiment, the database language is SQL and the statement is an SQL statement and the transaction prediction model may be implemented using a Marcov chain model. The Marcov model allows a flexible and clear implementation of the prediction model, having each transaction as a different state and the transitions in terms of probabilities between the different transactions. Alternatively, other modelling techniques can be used as well.

In another embodiment, the prediction of the next transaction is based on the current transaction. The prediction model may predict the next transaction class based only on the current transaction class, without consideration of the previous transition classes. This allows a fast calculation of the prediction, without taking great amount of resources of the database system. Alternatively, a prediction based on a predicted state can also be used.

In another embodiment, the application is an Online Transaction Processing (OLTP) application. These types of applications follow predefined input masks and hence for each input mask, typically the application logic produces similar database transactions. Typically, only the variable parameters of the statements are different between two transactions with the same sequence of generalized statements, making possible a prediction of the next transaction.

In another embodiment of the invention, the prediction of the sequence of generalized statements of the next transaction is used for pre-fetching data from a database. One of the advantages is that when the data is already in the buffer pool at the time that the statements are executed, the running time can be reduced.

In another embodiment of the invention, the prediction of the sequence of generalized statements is used for pre-compiling the statements before a user of an application issues the generalized statements. The advantage of the embodiment is that the statement compilation does not form part of the overall running time experienced by the client.

In another embodiment of the invention, the database workload further comprises an outcome per transaction, wherein the prediction of the next transaction further comprises a predicted outcome; the predicted outcome is used for deferring flushing a part of a buffer, the part of the buffer holding data changed by the transaction, when the predicted outcome is rolling back the transaction. The advantage is that the prediction of the outcome of a transaction is used to hold changes of a transaction in the buffer of the database system. In the case of a transaction rollback, it is not necessary to undo data changes on the persistent data storage, as the necessary data is kept at the buffer.

In another embodiment of the invention, the captured database workload further comprises an execution time of each transaction, wherein the prediction of the next transaction further comprises a predicted execution time to abort transactions with a low priority that are in conflict with high priority transactions.

In another embodiment of the invention, the database workload further comprises delay information between transactions, wherein the prediction model further comprises a prediction of a delay (301-306) between transaction classes. The prediction of delays further comprises a minimum and a maximum delay and a distribution function for each delay. The prediction of execution times and the prediction of delays are used to predict a start and a stop time of the predicted next transaction.

One of the advantages of the embodiments is that, by knowing the expected execution time of a transaction, the transaction with the shortest execution time are executed first, lowering the average waiting time for the transaction in the queue. Further, it is possible to abort transactions that have a long execution time and a low priority and are in conflict with high priority transactions. The transactions with long execution time are sent back to queue.

In another embodiment of the invention, the prediction of execution times, the prediction of delays, and the transaction prediction model is used for predicting a session time per user and accepting new sessions only when the predicted session time is below a predetermined threshold for low priority connections.

Due to the characteristics of the Markov model with a termination state, it is possible to obtain the average number of execution of each transactions class. The combination of the average number with the predicted execution times and the delays allow obtaining a predicted session time per user, application and/or time slots. The advantage is that certain user slots may be reserved for sessions with high priority, but can also be used for sessions with a low priority and a short expected runtime.

In another embodiment of the invention, the database system is located in a first server, wherein the database workload is transmitted to a separated architecture in a second server, the second server generating the transaction prediction model and sending the transaction prediction model to the first server. One of the advantages of the embodiment is that by separating the generation of the models and the executing of the prediction, the resources can be saved on the database system. The models are generated on a second system and submitted to the database system that executes the transactions and the statements. Alternatively, the second server can also be used for the computation of the next transaction and notify the database system of the next transaction.

In another embodiment of the invention, the identification of the current transaction is used for predicting the remaining statements of the current transaction class, when the prediction of the next transaction class has failed.

In embodiments, methods of generating a transactions prediction model using a computer for optimizing a number of transactions associated with a database system are presented, the methods including: causing the computer to capture a database workload, where the database workload includes a number of statements corresponding with the transactions over a specified period of time, where each of the number of statements includes at least one variable parameter; causing the computer to generate a number of first generalized statements from the number of statements by replacing the at least one variable parameter with a constant value; causing the computer to generate a number of second generalized statements, where if two or more of the number of first generalized statements are the same grouping the two or more of the number of first generalized statements to correspond with the number of second generalized statements; causing the computer to create a number of transactions classes, where each of the number of transaction classes includes at least one of the number of first generalized statements, and where each of the number of transaction classes represents a common sequence of transactions; causing the computer to identify a number of possible sequences between the number of transaction classes, where the number of transaction classes correspond with the database workload; and causing the computer to calculate a probability of the possible sequences between the number of transaction classes to generate the transactions prediction model.

In embodiments, database systems configured for creating and utilizing a transactions predictive model are presented, the database system including: a database management system (DBSM) for handling a number of transactions in the database system, the DBSM including a prediction component for generating the transactions predictive model; a database workload table for capturing a number of commands associated with the number of transactions, the number of commands utilized for generating the transactions predictive model; database data for providing data in response to the number of transactions; and a prediction model database for storing a number of transactions predictive models.

BRIEF DESCRIPTION OF THE SEVERAL VIEWS OF THE DRAWINGS

In the following preferred embodiments of the invention are described in greater detail by way of example only making reference to the drawings in which:

FIG. 1 shows a block diagram of a method of generating a transaction prediction model according to an embodiment of the invention.

DETAILED DESCRIPTION

Figure 2:
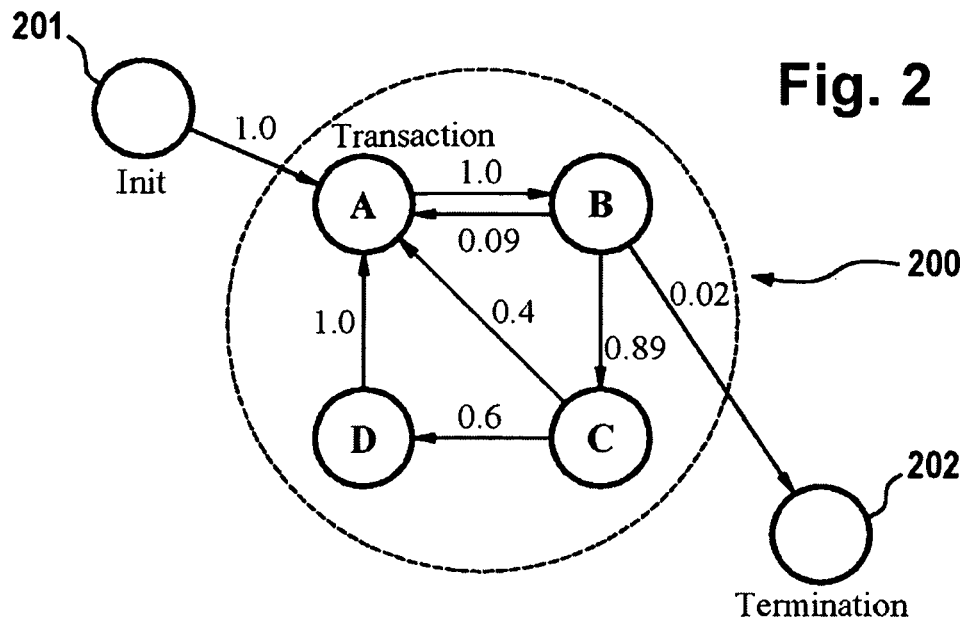
FIG. 2 shows an example of the transaction prediction model for one user using an application.

FIG. 1 shows an example of the method of generating transaction classes, comprising a database workload table 101, a generalization of the statements table 102, a generation of the generalized statements table 103 and a table of the classification of the sequence of generalized statements into transactions 104. The database workload 101 further comprises four columns including the user 105, the application type 106, the time slot 107, the statement 108 and the transaction id 117.

The first step to generate a transaction prediction model requires capturing the database workload. The database workload 101 may comprise different users using different applications running in different time slots. The database workload includes a series of different statements per user and per application. The database workload 101 comprises two users: "Alice" 108 and "Bob" 109, two different types of applications: "finance" 110 and "logistics" 111 and a different series of statements, as for example "select * from customers where name='Alice' and surname='P'" 112. Before the database workload 101 is further processed, this data is classified and filtered according to the users, the application type, the time slot or a combination of them.

In this example, the filter selects the statements from the user "Alice" and the application type "finance". These statements form a second table in a further step that consists of generalizing the statements 102, also known as anonymization of the statement, by replacing the variable parameters of the statement with the constant "?" as shown in table 102. For example, the statement "select * from customers where name='Alice' and surname='P'" is formed of statement text 113 and a variable parameter 114, that corresponds to the input "Alice" and "P". In the process of generalization or anonymization, the concrete parameter "Alice" and "P" are substituted with a constant value that in the example corresponds to a question mark. This process is repeated for all the statements that have been filtered out of the original database workload, substituting all the concrete parameters from the other statements as "Parker", "Richard", "M" or "12" with the question mark. The generalized statements are also known as anonymized statements.

Two statements are similar if the generalized statement text is the same. The third step of the method of generating a transactions prediction model includes generating a new generalized statement for each statement with a different statement text. Table 103 shows an example of all the statements with a common generalized statement and, where for example, the two statements "select from customer where name=Alice and surname=P" and "select from customers where name=Richard and surname=M" correspond to the same generalized statement "select from customers where name=? and surname=?". The creation of generalized statements is a dynamic process as new generalized statements may be generated according to the appearance of new types of statements with different statement texts.

After the dynamic classification or generation of the generalized statements has been completed, the transactions classes are created as shown in table 104. The transaction classes are grouping all transactions with a same sequence of generalized statements (102). Table 104 includes two types of transactions "A" and "B", where "A" 115 includes two generalized statements as "select * from customer where name=? and surname=?" and "select from account where K&R=?". The second transaction "B" 160 includes two generalized statements as are: "insert into customer values (?,?)" and "insert into account values".

The method of generating a transaction prediction model will then store all the transitions between the transactions for a specific user and/or application during a specific period of time and identify possible sequences between transactions by calculating the transition probability between two transactions, using all the previous completed transactions of the user and/or application. Further, it will compare at least a first issued generalized statement with at least a first statement of the transaction classes for identifying the current transaction class. In order to predict the next transaction class and/or the sequence of generalized statements, the model uses the highest probability of the calculated probabilities of the transaction class FIG. 2 shows an example of the of a prediction model implemented by a Markov model. The transactions prediction model example includes four transaction classes A, B, C, D, an Init state 201 and a termination state 202. The transactions prediction model further comprises eight transitions with their respective transition probabilities between the transaction classes.

This prediction model is the result of the observation analysis of the database workload during a predetermined period of time, and according to the steps shown in FIG. 1. In the Init state 201, according to the example model, there is 100% probability that it will make a transition to the transaction class A. Transaction class A includes a sequence of two generalized statements according to table 104. When this sequence has been completed, there is 100% probability that the transition from current transaction class A leads to transaction class B. Transaction class B includes a sequence of two generalized statements and, when these two generalized statements have been completed, there are two possible transitions: from B→C or from B→A. The transition from transaction class B to transaction class C has an 89% probability, and the transition from B to A has a 9% probability. There is a third possible transition from B to the termination state 202 with a probability of 2%. As the transition with the highest probability is the one from B to transaction class C, the model predicts that the next transaction class will be C. Transaction class C has two transition possibilities, 60% probability of doing a transition to transaction class D and a 40% probability of leading to transaction class A. The highest probability corresponds to the next transaction class D. If the prediction model fails on correctly predicting the next transaction class, the sequence of generalized statements for all transactions, as shown in 104, contains the information that allows the model predicting the sequence of generalized statements for the current transaction, so that this information is also used to improve the performance of the database system.

Figure 3:
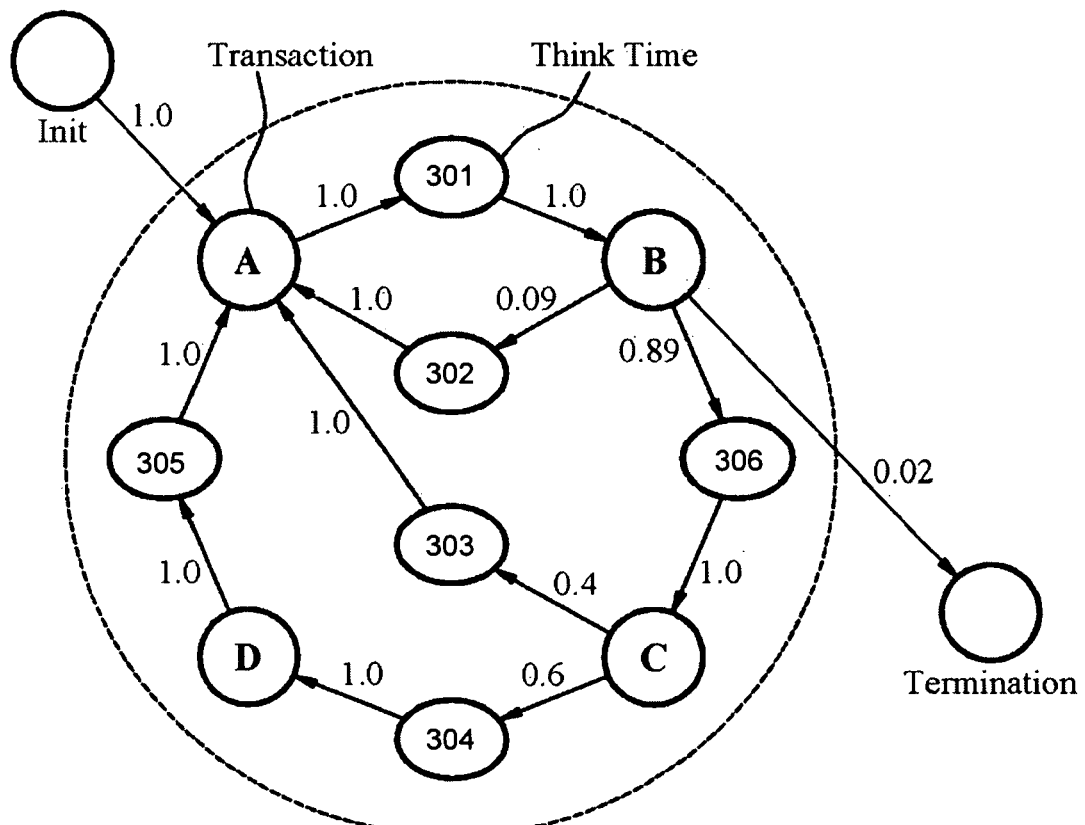
FIG. 3 shows a further example of a more detailed result of the transaction prediction model.

FIG. 3 shows a more detailed example of a transaction prediction model implemented by a Markov model, by including the think times between the transaction classes (301-306). The think time information is necessary in order to predict the starting time of the next predicted transaction class. A think time between the generalized statements in one transaction class may also be included in the model. The think times can be derived from the captured database workload. A distribution function of the think times can be approximated through the analysis of the arrival times of the statements with the captured database workload. FIG. 3 comprises all the transaction classes A, B, C, D and their transitions according to FIG. 2 and further comprises the think times for all these transitions.

For example, the think time 301 comprises a uniform distribution with a minimum of 60 seconds and a maximum of 120 seconds. In this example, the probabilities of the transition from the think time to the next transaction class correspond to 100% probability of transition. This predictions model corresponds to a specific type of application and for a specific user. A more specific predictions model may be calculated and may include prediction models for a specific time slot as a day of the week or a day of the month, or a specific time during the day.

Figure 4:
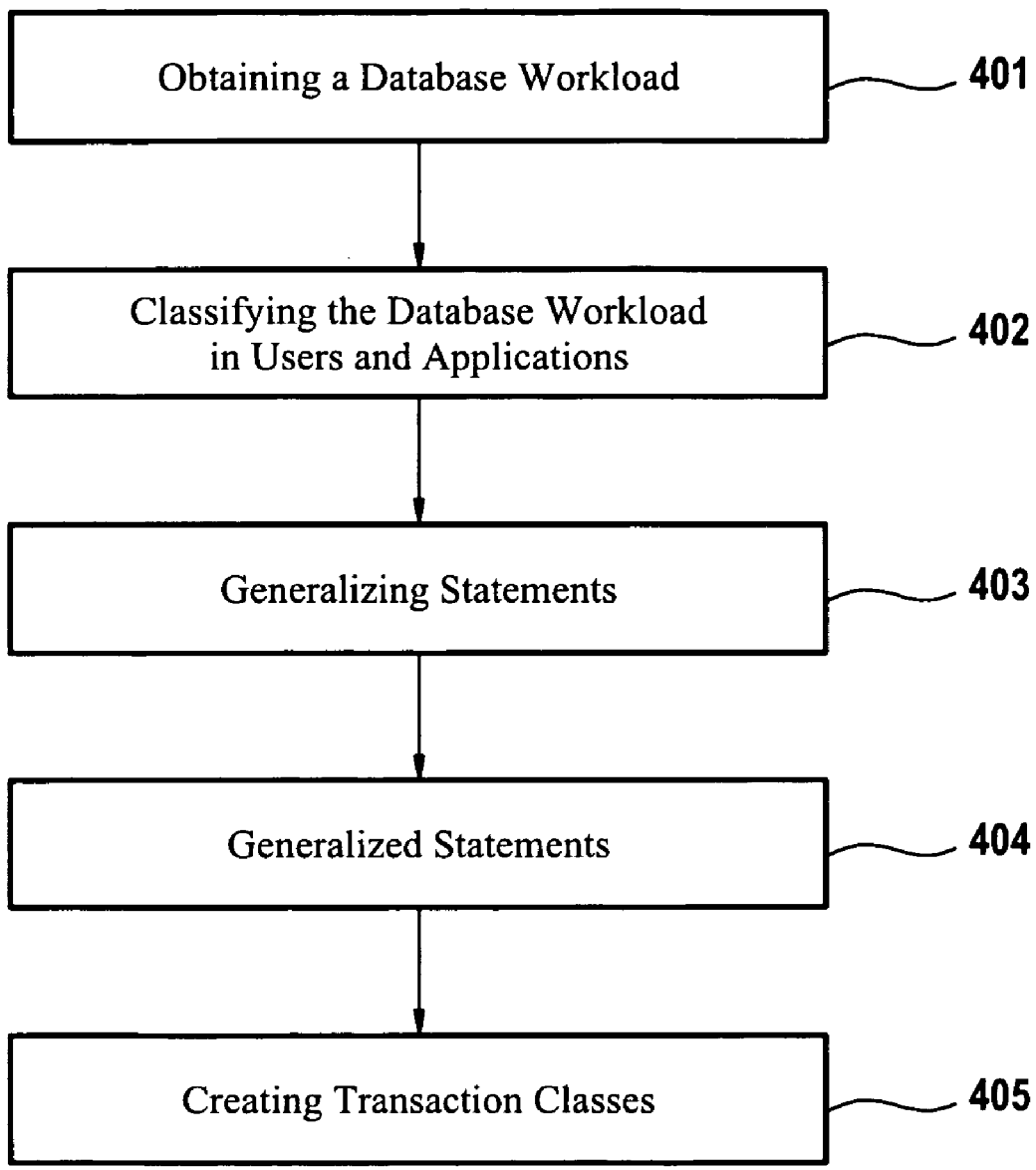
FIG. 4 shows a flowchart of the method of generating a transaction prediction model according to an embodiment of the invention.

FIG. 4 shows a flowchart of the method of generating the transaction classes for the prediction model in a database system. The first step 401 corresponds to capturing a database workload; the database workload including a list of the statements, the users, application, transaction ids and the time slot for each statement. The second step 402 classifies the database workload in users and applications according to the transactions needed for the prediction model that requires to be generated. The first step 403 generalizes the list of statements from the database workload by replacing the variable parameter with a constant value. The fourth step 404 generates a generalized statement for each statement with a different statement text. The fifth step 405 creates transaction classes by grouping all transaction with a same sequence of generalized statements using the transaction id (117).

With this information, the method identifies possible sequence between transaction classes by calculating probabilities of transitions between transaction classes and compares the issued generalized statements with the generalized statements of the transaction classes in order to identify the current transaction class. This comparison takes into consideration the position and amount of previous issued generalized statements and compares an equal number of issued generalized statements and the statements of the transaction classes. The method will then generate a possible sequence between transaction classes and calculates the probability of transitions between the transaction classes.

Figure 5:
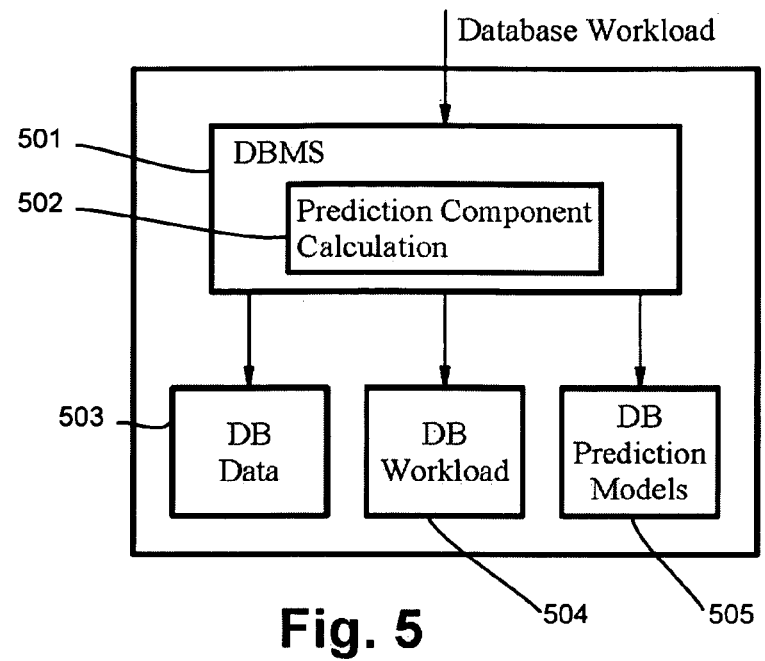
FIG. 5 shows a block diagram of the database systems in accordance with an embodiment of the invention.

FIG. 5 shows a block diagram of a database system that generates the transactions prediction model including a database management system 501, which further comprises the means for calculating the prediction model 502. The system comprises the database data 503, the database workload 504 and the database of the prediction models 505.

During the capturing period of the database workload, the database management systems receives the workload data, which is used as commands to be completed by the database management system, and are also stored into the database workload table 504. The information stored in the database workload table 504 is filtered according to the prediction model of the specific user and/or specific application, and possibly for a predetermined time slot, that requires to be generated. The means for calculating the prediction model 502 completes the following steps: generalizes the list of statements; generates the generalized statements for each statement with a different statement text; creates transaction classes; identifies possible sequence between transactions; identifies the current transaction and calculates the probabilities of transitions between the transactions.

With the information generated by the means for calculating the prediction model 502 a transactions prediction model for the specific user, application and time slot is generated and stored in the prediction model database 505. The same process is completed for different type of users, applications and time slots that are stored in the database 505 and that are later used in order to predict the next transaction and improve the performance of the queries for the database data 503.

Figure 6:
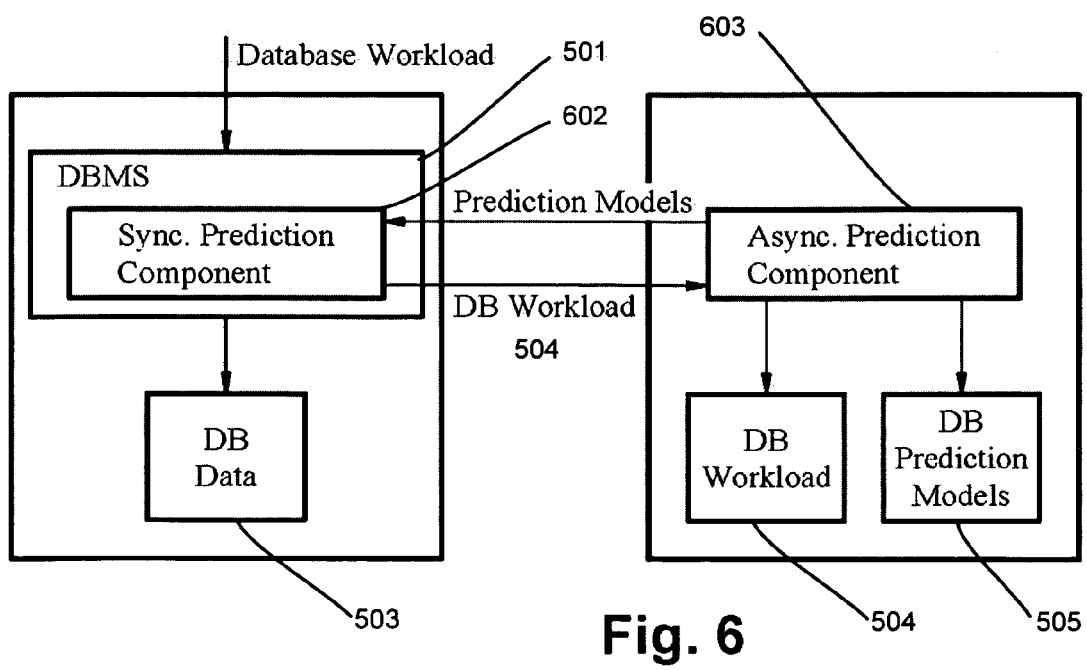
FIG. 6 shows a second block diagram of the database system in accordance with an embodiment of the invention.

FIG. 6 shows a flowchart of a database management system 600 according to a second embodiment of the invention that separates the generation of the model and the execution of the real time prediction component in order to save resources on the system. The database system includes a database management system 501, an asynchronous prediction component 602, a database data 503 and an asynchronous means for calculating the prediction model 603, database workload 504 and a prediction model database 505.

The database management system 501 sends the database workload 506 to the asynchronous means for calculating the prediction model 603 that calculates and generates the transaction classes and prediction models and stores the prediction models in the database 505. The means for calculating the prediction model is located on a second system separated from the database management system. After the generation of the prediction models, these are submitted to the synchronous prediction component 602 that uses them in order to predict the next transaction class and/or the sequence of the generalized statements. The asynchronous prediction component 603 can be also used for the tuning tasks that are not directly real time critical and that may have a delay in computation. This embodiment with the asynchronous prediction component 603 in a second server generates the prediction model using the historical workload data and does not need to observe the database workload in real time.

While the foregoing has been with reference to particular embodiments of the invention, it will be appreciated by those skilled in the art that changes in these embodiments may be made without departing from the principles and spirit of the invention, the scope of which is defined by the appended claims.

LIST OF REFERENCE NUMBERS

| | |
|---|---|
| 101 | Database workload |
| 102 | Generalized statement |
| 103 | Generate generalized statement |
| 104 | Sequence of generalized statements |
| 105 | User |
| 106 | Application Type |
| 107 | Time Slot |
| 108 | User "Alice" |
| 109 | User "Bob" |
| 110 | Finance |
| 111 | Logistics |
| 112 | "Select from customers . . . " |
| 113 | Statement text |
| 114 | Variable parameter |
| 115 | Transaction A |
| 116 | Transaction B |
| 201 | Init |
| 202 | Termination |
| 301 | Think time |
| 302 | Think time |
| 303 | Think time |
| 304 | Think time |
| 305 | Think time |
| 306 | Think time |
| 401 | First step |
| 402 | Second step |
| 403 | Third step |
| 404 | Forth step |
| 405 | Fifth step |
| 501 | DBMS |
| 502 | Prediction component |
| 503 | DB Data |
| 504 | DB Workload |
| 505 | DB Prediction model |
| 506 | Database workload |
| 602 | Sync. Prediction comp. |
| 603 | Async. Prediction comp. |

What is claimed is:

1. A method of generating a transactions prediction model using a computer for optimizing a plurality of transactions associated with a database system, the method comprising:

causing the computer to capture a database workload, wherein the database workload includes a plurality of statements corresponding with the transactions over a specified period of time, wherein each of the plurality of statements includes at least one variable parameter, and wherein each of the plurality of statements includes a database command;

causing the computer to generate a plurality of first generalized statements from the plurality of statements by replacing the at least one variable parameter with a constant value;

causing the computer to generate a plurality of second generalized statements, wherein two or more of the plurality of first generalized statements are the same grouping the two or more of the plurality of first generalized statements to correspond with the plurality of second generalized statements;

causing the computer to create a plurality of transactions classes, wherein each of the plurality of transaction classes includes at least one of the plurality of first generalized statements, and wherein each of the plurality of transaction classes represents a common sequence of transactions;

causing the computer to identify a plurality of possible sequences between the plurality of transaction classes, wherein the plurality of transaction classes correspond with the database workload;

causing the computer to calculate a probability of the possible sequences between the plurality of transaction classes to generate the transactions prediction model;

causing the computer to receive a current transaction;

causing the computer to identify one of the plurality of transaction classes corresponding with the current transaction from the transactions prediction model;

causing the computer to predict a next transaction class based on a highest probability of the transactions prediction model; and causing the computer to pre-fetch data associated with the next transaction class.

2. The method of claim 1, wherein if the pre-fetching the data is incorrect, causing the computer to incorporate the current transaction into the predictive model.

3. The method of claim 1, wherein the database workload further comprises:
   a user associated with each of the plurality of statements;
   a time slot associated with each of the plurality of statements;
   a transaction id associated with each of the plurality of statements; and
   an application associated with each of the plurality of statements.

4. The method of claim 3, wherein the plurality of transaction classes are classified in classes selected from the group consisting of: a user class, a time slot class, and an application class.

5. The method of claim 3, wherein a separate transaction prediction model is generated for each of the group consisting of: a user, a time slot, and an application.

6. The method of claim 3, wherein the application is enabled over an Online Transaction Processing application.

7. The method of claim 1, wherein the transactions prediction model is based on a Markov chain model.

8. The method of claim 1, further comprising:
   causing the computer to determine a think time between the possible sequences, the think time configured to at least predict when to start the next transaction class.

9. The method of claim 1, further comprising:
   causing the computer to defer a buffer flush based on a next transaction class data requirement.

10. The method of claim 8, further comprising:
    causing the computer to determine an execution time for each of the plurality of transaction classes, wherein the execution time is utilized for queuing the plurality of transaction classes, and wherein the execution time is utilized for aborting the plurality of transaction classes.

11. The method of claim 10, further comprising:
    causing the computer to determine a session time, wherein the session time is calculated from at least the execution time and the think time; and
    causing the computer to utilize the session time to determine access to the database system.

12. A computer program product for generating a transactions prediction model for optimizing a plurality of transactions associated with a database system, the computer program product comprising:
    a non-transitory computer readable medium;
    first program instructions for capturing a database workload, wherein the database workload includes a plurality of statements corresponding with the transactions over a specified period of time, wherein each of the plurality of statements includes at least one variable parameter, and wherein each of the plurality of statements includes a database command;
    second program instructions for generating a plurality of first generalized statements from the plurality of statements by replacing the at least one variable parameter with a constant value;
    third program instructions for generating a plurality of second generalized statements, wherein two or more of the plurality of first generalized statements are the same grouping the two or more of the plurality of first generalized statements to correspond with the plurality of second generalized statements;
    fourth program instructions for creating a plurality of transactions classes, wherein each of the plurality of transaction classes includes at least one of the plurality of first generalized statements, and wherein each of the plurality of transaction classes represents a common sequence of transactions;
    fifth program instructions for identifying a plurality of possible sequences between the plurality of transaction classes, wherein the plurality of transaction classes correspond with the database workload;
    sixth program instructions for calculating a probability of the possible sequences between the plurality of transaction classes to generate the transactions prediction model;
    seventh program instructions for receiving a current transaction;
    eighth program instructions for identifying one of the plurality of transaction classes corresponding with the current transaction from the transactions prediction model;
    ninth program instructions for predicting a next transaction class based on a highest probability of the transactions prediction model; and
    tenth program instructions for pre-fetching data associated with the next transaction class.

13. The computer program product of claim 12, wherein
    if the pre-fetching the data is incorrect, eleventh program instructions for incorporating the current transaction into the predictive model.

14. The computer program product of claim 12, further comprising:
    twelfth program instructions for determining a think time between the possible sequences, the think time configured to at least predict when to start the next transaction class.

15. The computer program product of claim 12, further comprising:
   thirteenth program instructions for deferring a buffer flush based on a next transaction class data requirement.

16. The computer program product of claim 14, further comprising:
   fourteenth program instructions for determining an execution time for each of the plurality of transaction classes, wherein the execution time is utilized for queuing the plurality of transaction classes, and wherein the execution time is utilized for aborting the plurality of transaction classes.

17. The computer program product of claim 16, further comprising:
   fifteenth program instructions for determining a session time, wherein the session time is calculated from at least the execution time and the think time; and
   sixteenth program instructions for utilizing the session time to determine access to the database system.

\* \* \* \* \*